(12) United States Patent
Lesemann et al.

(10) Patent No.: US 7,087,156 B2
(45) Date of Patent: *Aug. 8, 2006

(54) PROCESS FOR REMOVAL OF NITROGEN CONTAINING CONTAMINANTS FROM GAS OIL FEEDSTREAMS

(75) Inventors: Markus Friedrich Manfred Lesemann, Baltimore, MD (US); Constance Setzer, Mainz (DE)

(73) Assignee: W.R. Grace & Co. - Conn., Columbia, MD (US)

( * ) Notice: Subject to any disclaimer, the term of this patent is extended or adjusted under 35 U.S.C. 154(b) by 528 days.

This patent is subject to a terminal disclaimer.

(21) Appl. No.: 10/322,417

(22) Filed: Dec. 19, 2002

(65) Prior Publication Data

US 2004/0118748 A1 Jun. 24, 2004

(51) Int. Cl.
*C10G 45/04* (2006.01)
*C10G 25/05* (2006.01)
*C07C 7/12* (2006.01)

(52) U.S. Cl. ............ 208/211; 208/213; 208/354 R; 208/244; 208/249; 208/299; 208/305; 585/820; 585/822; 585/823

(58) Field of Classification Search ............ 585/820, 585/822, 823; 208/213, 211, 254 R
See application file for complete search history.

(56) References Cited

U.S. PATENT DOCUMENTS

| | | | |
|---|---|---|---|
| 2,384,315 A | 9/1945 | Kuhl ........................... | 196/44 |
| 2,744,053 A | 5/1956 | Kay et al. .................... | 196/28 |
| 3,189,549 A | 6/1965 | Sieg ............................ | 208/254 |
| 3,649,528 A | 3/1972 | Katzmark et al. .......... | 208/294 |
| 4,708,786 A | 11/1987 | Occelli ....................... | 208/120 |
| 5,051,163 A | 9/1991 | Krug et al. ................... | 208/88 |
| 5,210,326 A | 5/1993 | Marquez et al. ............ | 568/697 |
| 5,300,218 A * | 4/1994 | Graiff et al. ................. | 208/299 |
| 5,378,250 A | 1/1995 | Marquez et al. ............. | 44/447 |
| 5,414,183 A | 5/1995 | Abrevaya et al. ........... | 585/671 |
| 5,454,983 A | 10/1995 | Michael et al. ............. | 252/545 |
| 5,675,043 A | 10/1997 | Eppig et al. ................ | 568/697 |
| 5,744,686 A | 4/1998 | Gajda ........................ | 585/823 |
| 5,770,047 A | 6/1998 | Salazar et al. .............. | 208/254 |
| 5,897,845 A | 4/1999 | Denny et al. ............... | 423/210 |
| 5,942,650 A | 8/1999 | Gajda ........................ | 585/448 |
| 6,099,619 A | 8/2000 | Lansbarkis et al. ........... | 95/118 |
| 6,107,535 A | 8/2000 | Rossini et al. .............. | 585/823 |
| 6,118,037 A | 9/2000 | Piccoli et al. ............... | 585/820 |
| 6,150,300 A | 11/2000 | Khare et al. ................ | 502/407 |
| 6,231,755 B1 * | 5/2001 | Mesher et al. .............. | 208/237 |
| 6,248,230 B1 | 6/2001 | Min et al. ................... | 208/213 |

FOREIGN PATENT DOCUMENTS

DE 198 17 758 A 1 10/1998

| | | |
|---|---|---|
| EP | 1 101 521 A1 | 5/2001 |
| WO | WO 97/39994 | 10/1997 |
| WO | WO 99/67345 | 12/1999 |
| WO | WO 00/64556 | 11/2000 |

OTHER PUBLICATIONS

Whitehurst et al. In Adv. Catal. 42, 345–471 (1998).
S. Shin et al., Energy & Fuels (2000), 14(3), 539–544.
Wiwel et al. in "Assessing Compositional Changes of Nitrogen Compounds of Typical Diesel Ranges Gas Oils . . . " (Industrial & Engineering Chemistry Research (2000), 39(2), 533–540.
E. Rakiewicz et al., J. Phys. ChemB, 102, 2890–2896 (1998) entitled "Characterization of Acid Sites in Zeolite and Other Inorganic Systems Using Solid State 31 P NMR of the Probe Molecule Trimethylphosphine Oxide".
J–E Otterstedt and D. Brandreth in "Small Particle Technology", Chapter 3, 85–155 (1998).
K. Tanabe et al., In "Studies in Surface Science and Catalysts" 51, 108–113 (1989).
S. Brunauer, P. Emmett and E. Teller in J.A.C.S. 60, 209–319 (1938) "Adsorption of Gas in Multimolecular Layers".
D.D. Whitehurst, K.G. Knudsen, P. Wiwel and P. Zeuthen "The Influence of Trace Amounts of Nitrogen Compounds on the Achievement of Future Sulfur Specifications in Diesel Fuels—Part 2: HDS Inhibition Studies with Real Feeds and Isolated N–Compound Fractions": Symposium on Meeting Sulfur Specifications for 2000 and Beyond; 219th National Meeting. American Chemical Society, San Francisci, CA (2000).
D. Stratiev, D. Minkov, "Investigation of the Influence of Basic Nitrogen Compounds on Yield Distribution in Fluid Catalytic Cracking", Bulgarian Chemical Communications 30, 1–4 (1998).
K.G. Knudsen et al., "A Detailed Understanding of the Inhibition Effect of Organic Nitrogen Compounds for Ultra Deep HDS an the Consequences for Choice of Catalyst", Paper Presented at AIChE 2000 Spring National Meeting, Atlanta, GA, Mar. 5–9, 2000.

* cited by examiner

*Primary Examiner*—Tam M. Nguyen
(74) *Attorney, Agent, or Firm*—Howard J. Troffkin; Charles A. Cross

(57) ABSTRACT

The present invention is directed to the removal of nitrogen and sulfur containing impurities from high molecular weight petroleum feedstock obtained from fluid cracking catalyst or distillation zone of a petroleum treatment plant. The present process comprises first treating $C_{12}$ and higher hydrocarbon petroleum feedstock having nitrogen and sulfur containing compounds therein with a porous, particulate adsorbent comprising a silica matrix having an effective amount of metal atoms therein to cause the adsorbent to have Lewis acidity of at least 500 µmol/g and then treating the resultant feedstock to catalytic hydrodesulfurization to produce a hydrocarbon fuel having low sulfur and nitrogen content.

44 Claims, 3 Drawing Sheets

PROCESS FOR REMOVAL OF NITROGEN CONTAINING CONTAMINANTS FROM GAS OIL FEEDSTREAMS

FIELD OF THE INVENTION

The present invention is directed to an improved method of producing a petroleum fuel, in particular a diesel fuel, substantially free of nitrogen and sulfur containing compounds. Specifically, the present method comprises treating petroleum hydrocarbon feedstock having a boiling point range of from about 125 to 560° C. (preferably a petroleum cut of $C_{12}$ and higher hydrocarbon) with a silica adsorbent having high Lewis acidity imparted thereto prior to subjecting the feedstock to conventional catalytic hydrodesulfurization. The presently required pretreatment has been found to readily remove nitrogenous compounds from the feedstock and permit the hydrodesulfurization to take place more efficiently and more effectively to yield a petroleum product of reduced nitrogen and sulfur content.

BACKGROUND OF THE INVENTION

Environmental pollution problems, especially air quality degradation, have become a high concern throughout the world and especially in industrial developed countries. Such concerns have led to environmental regulatory policies imposing tight quality regulations on transportation fuels. Of such fuels, diesel fuel is considered to be a major contributor of known harmful pollutants, such as $SO_x$, $NO_x$, and particulate matter and, therefore, stringent regulatory standards have been proposed and enacted to reduce the emission of such pollution by diesel fuels.

The sulfur content in fuels is a critical concern, as it is known to form sulfur dioxide when subjected to a combustion process. The sulfur dioxide, together with atmospheric moisture, forms sulfuric acid in the atmosphere. This is the cause of acid rain, which has been attributed to causing substantial damage on the environment as well as man-made structures.

In addition, the generated sulfur oxides have been found to poison noble metal catalysts conventionally used as part of automobile emission after-treatment devices. For this reason, automobile manufacturers have suggested that sulfur content in diesel fuels be reduced to less than 30 weight parts per million (ppm) to meet new tail-pipe emission regulations contemplated to become law. Thus, an ultra-low sulfur diesel (ULSD) market is emerging to replace conventional sulfur diesel fuel standards of 500 ppm. In various countries, such as in the United States and in a number of European countries, regulations have been proposed or enacted to require sulfur content to be reduced to levels of less than 50 ppm and, in certain instances, to levels of less than 15 ppm. In view of the ever-increasing regulatory pressures, petroleum refiners and catalyst producers have invested considerable time, money and effort to produce environment-friendly petroleum products.

Hydrodesulfurization (HDS) processes most commonly used reduce sulfur content in petroleum feedstock by converting sulfur compounds present in the feedstock to hydrogen sulfide. Since the 1960's various HDS processes have been developed which, in general, subject the feedstock to hydrogen under elevated temperatures and pressures in the presence of a catalyst. One mode of reducing the sulfur content is to develop innovative improvements in one or more of the operating parameters of catalyst activity, reaction temperature, bed volume and/or hydrogen partial pressure of the HDS process.

Although catalyst activity has been doubled since HDS catalysts were first introduced, it has been calculated that a factor of 3.2 fold activity improvement is required to meet the present 500 ppm sulfur content and a factor of about 17 is needed to reach the 50 ppm level more highly desired. Thus, if one relies on catalyst activity alone, the number of HDS reactors must be substantially increased and/or, the charge rate substantially decreased unless the catalyst activity is dramatically improved.

As stated above, the reaction temperature can be increased to cause reduction in sulfur content. However, such temperature increase can only be done to a small degree due to the design limitations of present equipment. In addition, very high temperatures are known to cause degradation to the product stream. Similarly, increased pressure would aid in achieving reduced sulfur content but presently designed reactors establish a limit on this parameter, and new equipment capable of handling very high pressures would be costly.

Thus, conventional processes for treating diesel feedstock (also known as light gas oil, LGO) have technical limitations while breakthroughs in catalyst activity have not been realized. Therefore, methods, which use different feedstock instead of LGO, or using innovative reaction pathways, are being studied.

For example, a process developed by Shell Oil Company polymerizes natural gas to produce a distillate composed of $C_{12}$–$C_{25}$ products, similar to diesel feedstock. In this process natural gas is converted to syn-gas through a Fischer-Tropsch reaction and the product is polymerized to yield diesel distillate free of sulfur compounds. This process has the drawbacks of using fairly expensive feed and requiring three distinct reaction steps to result in a high cost process.

U.S. Pat. No. 5,454,933 discloses an adsorption process to produce sulfur-free diesel fuel by removing remaining sulfur compounds from LGO material that has already undergone hydrodesulfurization. The disclosed post-HDS process utilizes adsorbents designed to directly remove residual sulfur compounds from post-HDS treated material.

It has been proposed that reduction or removal of nitrogen containing compounds from streams being fed to a catalytic HDS unit causes HDS to take place in a more efficient manner and, thus, make the system capable of producing a product with very low sulfur content using conventional operating parameters.

It is well known that heteroatom containing compounds, particular nitrogen and sulfur containing compounds can be readily removed from light cuts, such as $C_4$–$C_8$ streams, as is obtained from a conventional FCC unit or etherized streams. Different processes, such as adsorption and extraction have been proposed for this purpose. Heteroatom contaminant compounds that are found in such light cut streams are few in number, readily identified, have low molecular weights and have low boiling points consistent with the light hydrocarbons forming this type of cut. As a consequence, these contaminants are easily removed from the feedstream in which they are contained. These features are not applicable with respect to the more complex mixture of heteroatom containing compounds found in heavier hydrocarbon streams. The heavier LGO streams, composed primarily of $C_{12}$–$C_{30}$ and higher compounds obtained from distillation or FCC units or the like, contain a vast mixture of heteroatom species. These compounds have been difficult to identify, are generally composed of high molecular weight compounds and have high boiling points. Some of the sulfur species have been identified and studied by Whitehurst et al. in Adv.

Catal. 42, 345–471 (1998). Attempts to identify the nitrogen species of such gas oil cuts have been illusive and challenging due to the concentration in the hydrocarbon matrix and the complexity of the mixture of species. A group of scientists from Kyushu University at Fukuoka, Japan and Chevron Research and Technical Company at Richmond, Calif., have attempted to identify nitrogen containing compounds of gas oils and were only capable of reporting broad classes including alkyl substituted aniline, quinoline and its alkyl derivatives, and, carbazole derivatives (S. Shin et al., Energy & Fuels (2000), 14(3), 539–544. Wiwel et al. in "Assessing Compositional Changes of Nitrogen Compounds of Typical Diesel Range Gas Oils . . . " (Industrial & Engineering Chemistry Research (2000), 39(2), 533–540) reported that crude oil generally contains from about 0.1 to 2 percent nitrogen compounds but the nitrogen content rapidly increases with increasing boiling point of the oil fraction. Recognizing that diesel fuels are commercially prepared from straight run distillates and cracked products of heavier feedstock, the nitrogen levels normally range from 20–1000 µgN/ml. They report that such compounds are generally made up of four different chemical classes: aliphatic amines, anilines, and five- and six-membered pyridinic ring system compounds. They have identified some 64 compounds (using the method of ASTM D-4629–91) and stated that many more unidentified compounds are contained in this heavier fraction of material.

Removal of nitrogen containing compounds from light cut ($C_4$–$C_8$) petroleum streams has been accomplished because the nitrogen compounds are fewer in number, are readily identifiable and have lower molecular weight. However, because nitrogen containing compounds in heavier fraction material are difficult to identify and, at best, are a complex mixture of compounds, removal has been illusive.

U.S. Pat. No. 2,384,315 discloses filtering crude oil through a bed of bauxite prior to subjecting the oil to catalytic cracking treatment. Such procedure would produce a product still having high amounts of nitrogen compounds relative to today's required standards.

U.S. Pat. No. 2,744,053 discloses the removal of nitrogen compounds from low boiling gasoline hydrocarbon stock by passing the feedstock through an adsorption bed formed from silicon oxide alone or a mixture of silicon oxide and alumina. It is well known that silicon oxide and other conventional adsorbents do not exhibit the Lewis acidity required by the adsorbent used in the present invention.

U.S. Pat. No. 4,708,786 discloses a fluid catalytic cracking process in which the feedstock is treated with a mixture of cracking catalyst and micro-porous refractory oxide capable of sorbing pyridine at room temperature and retaining a portion of the sorbed material. This sorbent is to be used in conjunction with the catalyst in the FCC zone.

U.S. Pat. No. 5,051,163 discloses a process wherein the initial feed to a catalytic cracking reactor is first treated with a small amount of the cracking catalyst. The reference suggests that the nitrogenous material will bind with sacrificial catalyst present in the pre-cracking zone to thus prevent poisoning of the cracking catalyst used in the cracking zone. No suggestion is made as to removal of nitrogenous compounds just prior to hydrodesulfurization that would further decrease the sulfur content after HDS, to enhance the effectiveness of the HDS and to inhibit poisoning of HDS catalyst.

U.S. Pat. Nos. 5,210,326 and 5,378,250 are directed to processes which include treating light ($C_3$–$C_8$) hydrocarbon stream obtained from a FCC process zone with a super activated alumina to remove nitrogen compounds, mercaptans and water prior to further processing.

U.S. Pat. Nos. 6,107,535 and 6,118,037 also teach processes, which include treatment low molecular weight ($C_3$–$C_8$) hydrocarbon streams with silica gels to remove contaminant compounds that contain sulfur, nitrogen and/or oxygen.

U.S. Pat. No. 6,248,230 discloses a process for manufacturing cleaner fuels by removing natural polar compounds (NPC) from a wide range boiling point petroleum feedstream prior to subjecting the stream to catalytic hydrodesulfurization. The reference teaches that petroleum hydrocarbon product streams obtained from FCC or the like process can be contacted with an adsorbent, such as silica gel, hydrated alumina, activated carbon, active alumina, or clay. The reference states that silica or hydrated alumina are each preferred adsorbent. Such adsorbents are known to be substantially free or have only limited degrees of Lewis acidity. Although this reference indicates that large amounts of the NPC contained in the treated petroleum feedstock can be removed, such removal, especially from an LGO stream, requires uneconomically high ratios of adsorbent to feed.

The above references illustrate the desire by the petroleum refining industry to remove hetero-atom containing compounds from light cut petroleum products. Unfortunately, heavier fraction material, such as diesel fuel fractions have not been successfully treated to remove nitrogen and sulfur containing contaminants commonly found therein in a cost-effective, efficient manner to provide an environmentally friendly product. The removal of organic nitrogen is important to many different refinery processes and is essential to provide a diesel fuel products, which meet the environmental needs and associated regulations being proposed and enacted into law. It is highly desired to provide a cost-effective process to remove a majority or substantially all of nitrogenous compounds from diesel fuel fractions so that the treated diesel fuel feedstream can be effectively and efficiently treated by conventional HDS processes to produce a resultant material having less than 50 ppm and more preferably less than 15 ppm of sulfur containing compounds in the resultant product stream.

An object of the present process is to provide a cost-effective and efficient means of removing nitrogenous compounds from a diesel fuel fraction ($C_{12}$ and greater, e.g. $C_{12}$–$C_{30}$ petroleum feedstream) prior to subjection to HDS treatment.

Another object of the present invention is to provide an economical and efficient means of removing at least about 75 weight percent, preferably at least about 80 weight percent and more preferably at least about 90 weight percent of nitrogenous compounds from a diesel fuel fraction prior to subjection to HDS treatment.

Another object of the present invention is to effectively produce a diesel fuel, which meets present and contemplated environmental regulations with respect to emission of $NO_x$ and $SO_x$ pollutants.

SUMMARY OF THE INVENTION

The present invention is directed to an improved method of producing diesel fuel and other high molecular weight petroleum products substantially free of nitrogen and sulfur containing organic contaminants. Specifically, the present method comprises first contacting a petroleum feedstream composed of LGO and higher molecular weight petroleum materials obtained from a distillation or FCC catalytic cracking zone or the like with silica adsorbents rich in Lewis acid sites, as fully described herein below, to remove nitrogen compounds from said LGO, and subsequently subjecting the treated LGO to deep catalytic hydrodesulfurization. The present method has been found to provide a means of removing organic nitrogen containing compounds from $C_{12}$ and higher gas oil feedstreams in an effective and efficient manner.

The present invention is directed to an improved and economical process of producing diesel fuels capable of exhibiting very low levels of pollutants, especially nitrogen oxides and sulfur oxide products and other pollutants derived therefrom, when utilized in combustion engines.

BRIEF DESCRIPTION OF THE FIGURES

FIG. 1 graphically shows that the adsorbent of the present invention provides substantially greater adsorption capacity for nitrogen containing molecules in LGO than conventional silica gel adsorbent materials.

FIG. 2 graphically shows that the absorbents of the present invention provide substantially greater adsorption capacity for nitrogen containing molecules than conventional silica gel adsorbent materials. The sample materials vary substantially in surface area, but when the data of the examined silica/alumina gel of high Lewis acidity is normalized with respect to surface area, the data follows a single line. All of the illustrative samples exhibited significantly higher adsorption capacity than known high surface area silica gel adsorbent materials.

FIG. 3 graphically shows that adsorbents of the present invention provide substantially greater adsorption capacity for nitrogen containing molecules than such conventional alumina adsorbent material.

DETAILED DESCRIPTION

Figure 1:
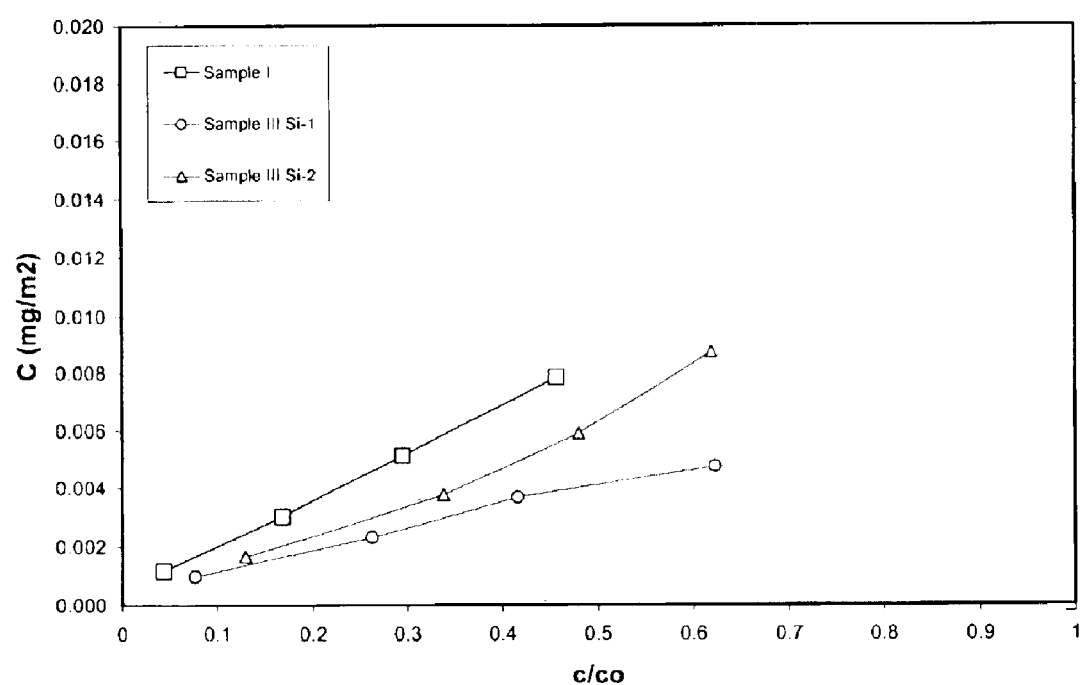
FIG. 1 is a graphic representation of the adsorption capacity for nitrogen containing compounds with respect to an adsorbent labeled "Sample I", illustrative of the present invention (silica xerogel having zirconia therein to impart a Lewis acidity of 1940 µmole/g, formed according to Example 1). This material is compared to high surface area silica gel adsorbent materials labeled "SampleSi/1" and "Sample Si/2" formed according to Example 3. These comparative adsorbents do not exhibit Lewis acidity.
Figure 2:
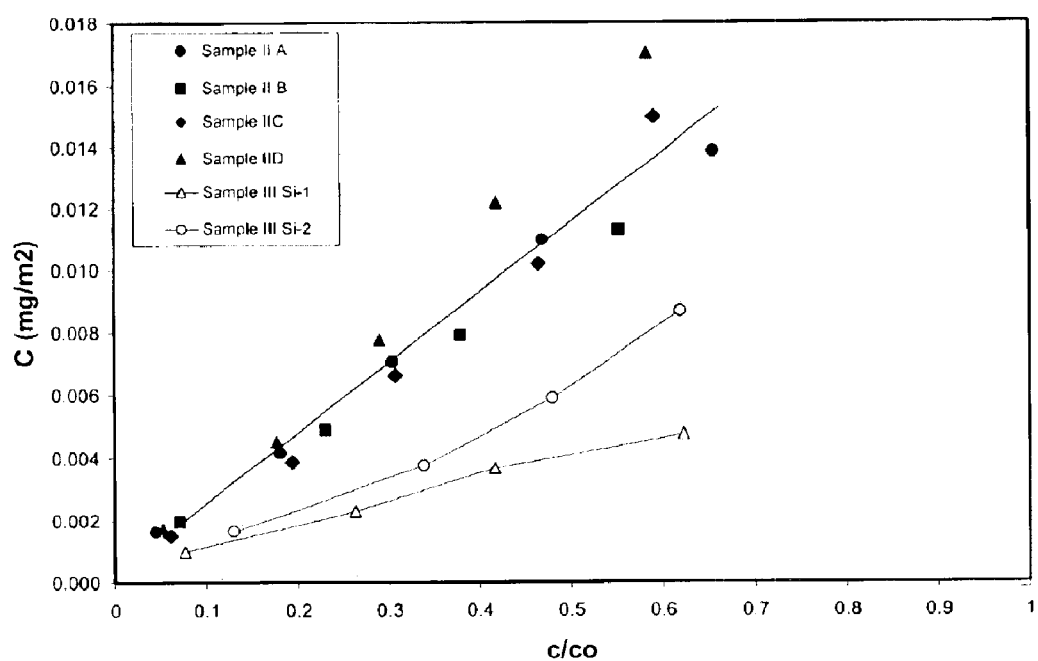
FIG. 2 is a graphic representation of the adsorption capacity for nitrogen containing compounds with respect to adsorbents illustrative of the present invention (silica xerogel having alumina in amounts to impart high Lewis acidity) as fully described in Example 2. These materials are compared to known high surface area silica gel adsorbent materials labeled Sample Si/1 and Sample Si/2 formed according to Example 3.
Figure 3:
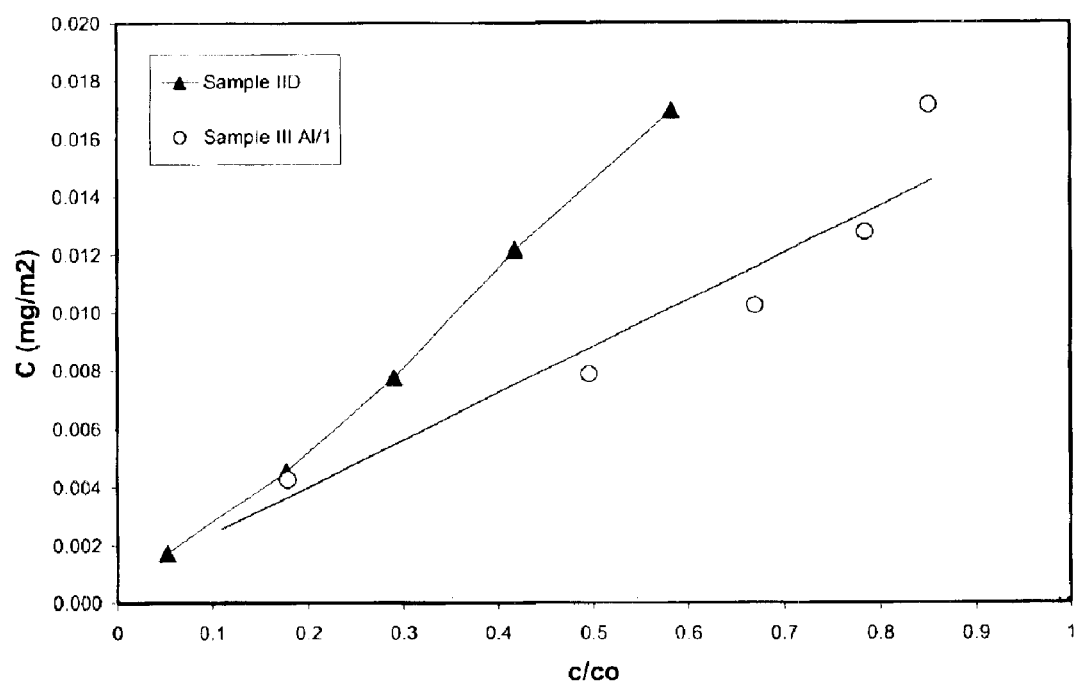
FIG. 3 is a graphic presentation of the adsorption capacity for nitrogen containing compounds with respect to adsorbents illustrative of the present invention (silica xerogel having alumina therein in amounts to impart high Lewis acidity) as fully described in Example 2. These materials are compared to known, high surface area alumina adsorbent formed in accordance to Example 3.

Petroleum refining conventionally treats petroleum crude to a process, such as a fluid cracking catalyst (FCC) process, wherein the crude is contacted with a FCC catalyst under elevated temperature and pressure and/or a distillation process, to produce a plurality of petroleum product streams of different molecular weight compounds and related ranges of boiling points. For example, the product streams may be defined as light cut material composed of $C_4$–$C_8$ hydrocarbons normally having a boiling range of from about 0° C. to about 115° C.; light gas oils (LGO) or diesel fuel product stream composed of $C_{12}$–$C_{30}$ (e.g. $C_{12}$–$C_{25}$) hydrocarbons which normally has a boiling range of from about 200 to about 550° C., such as from about 225 to about 460° C. The heavy bottom product stream of the FCC unit (resids) is composed of high molecular weight material. The residuals are not conventionally used as fuel for combustion engines although they may be used for such purpose in certain applications.

The product stream composed of LGO or diesel fuel is the target material to which the present invention relates although even heavier petroleum feed streams can be similarly treated to remove nitrogen contaminants therein. It is immaterial as to the exact mode of forming this material although they are commonly formed by distillation or FCC processing of petroleum crude. As stated above, one of the concerns with LGO streams is that they normally contain a large amounts and many different complex nitrogen-containing compounds that, in general, are not readily identified but are believed to reduce the effectiveness of the HDS processing of the feedstream. The exact amount and composition of these compounds depends on the source of petroleum crude being processed.

Removal of nitrogen containing compounds from petroleum feed stream prior to a hydrodesulfurization (HDS) unit is believed to cause the HDS process to take place in a more efficient manner to produce a desired, more environmentally friendly diesel fuel. It is believed, though not meant to be a limitation on the present invention, that nitrogen containing compounds combine with the active sites of HDS catalysts and, therefore, the removal of such compounds aids in causing the catalysts to provide for enhanced HDS processing. By using low nitrogen content material as the feed for a conventional HDS unit, one enhances the effectiveness of the HDS process to enable the process to be conducted at lower processing temperatures or higher flow rates while extending the life of conventional desulfurization catalyst utilized. The product of the HDS unit has been found to have very low sulfur content, such as less than 50 ppm or even less than 30 ppm and even less than 15 ppm sulfur content.

The present inventors have discovered that LGO (diesel fuel) streams of $C_{12}$ and higher composition can be readily treated in a cost-effective and efficient manner to remove nitrogen contaminants from the LGO stream prior to its introduction to a HDS zone. The present process utilizes certain Lewis acid enhanced silica adsorbents fully described herein below. These adsorbents have been found to effectively achieve removal of nitrogen contaminants commonly contained in the LGO feedstream without the need to require multiple passes, the use of economically undesirable low flow rates (liquid hourly space velocity), or economically undesirable ratios of feed to adsorbent (before regeneration of the adsorbent becomes necessary), when treating the stream.

In general, the present process can be achieved by contacting an LGO feedstream with the presently required adsorbent prior to introducing the feedstream to a HDS zone of a refinery. Contact may be done by any known method of contacting a solid and a liquid material, such as by utilization an adsorption zone composed of one (suitable for a batch process) or two or more (suitable for a continuous process) fixed bed (packed bed) columns, fluidized bed columns, or an abullating bed zone. The preferred adsorption zone is a fixed or packed bed system.

The present invention shall be described using the preferred fixed or packed bed system, although other adsorption zone systems can be readily substituted for such systems by those skilled in this art. Normally, columns are packed with the present adsorbent, which is allowed to contact the petroleum feed stream and cause adsorption of the nitrogen contaminant compounds therein. The adsorbent, at a point of exhaustion of its adsorbent capacity or prior thereto, is subjected to desorption to remove the nitrogen contaminants therefrom and finally to regeneration in order to reestablish the adsorbent capacity of the adsorbent. A continuous process can be readily achieved by using a plurality of columns in which at least one column is in an adsorption mode while the adsorbent of at least one other column is being desorbed of nitrogen contaminant and being regenerated.

The nitrogen contaminant is immobilized on the adsorbent. The term "immobilized" and "adsorbed" as used herein and in the appended claims refer to physical and/or chemical adsorption (adhesion of the nitrogen compound to the surface of the adsorbent) and/or physical absorption (penetration into the inner structure of the adsorbent. Without wishing to be bound by any particular theory, it is believed that the nitrogen contaminants form some type of weak bond with the present adsorbent. The structure of such bond may be merely physical or ionic or dative or a mixture thereof.

The adsorbent required by the present invention is a porous silica matrix material having high Lewis acidity imparted thereto. More specifically, the adsorbent used in the present invention is in the form of particulate adsorbent formed from (a) $SiO_2$, having its atoms in a three dimensional matrix, which may be composed of lattice-like or amorphous material (preferred) or a mixture of both. In general, the silicon atoms of the matrix are bridged by oxygen atoms in a three dimensional configuration. The degree of crystalline lattice-like structure of a matrix can be determined by conventional X-ray diffraction spectroscopy or similar techniques; and (b) at least a sufficient amount of a component capable of imparting Lewis acidity to the silica component (a) of the resultant adsorbent.

The three dimensional silica matrix material (in the form of a gel or the like), component (a) of the present adsorbent, prior to treatment with component (b) described below, is known not to exhibit Lewis acidity when in the pure state or to exhibit very low degrees of Lewis acidity of less than about 100, generally less than about 50 and, in most instances, less than about 20 µmol/gm due to small amounts of impurities.

Lewis acidity of a high degree may be imparted to component (a) by insertion or substitution of metal atoms into the silica matrix to establish electron poor sites within the matrix. The Lewis acid imparting metal atoms may be made a part of the resultant adsorbent by contacting the silica matrix material with a precursor compound (b) of the desired metal atom. The Lewis acid-imparting metal derived from the precursor (b) may be selected from at least one metal atom of Group IB, IIA, IIB, IIIA, IIIB, IVA, VA, VIA or VIIIA of the Periodic Table (IUPAC format). For example, the metal atoms can be selected from Mg, Ca, Sr, Ba, B, Al, Ga, Zn, Sc, Y, La, Ti, Zr, Hf, V, Nb, Mo, W, Fe, Co, Ni, or mixtures thereof with Mg, Ca, Zn, La, Ti, Zr, Fe, Co, Ga and Al and mixtures thereof being preferred and Mg, Zn, La, Ti, Zr, Fe and Al and mixtures thereof being more preferred, and Zr, Al, Fe and Ti being most preferred. For example, a portion of the Si atoms of a silica gel may be substituted by one of the above described metal atoms or mixtures thereof, as more fully described herein below.

The metal atoms of the precursor (b) may be introduced into the matrix material (a) by any method and in amounts whereby the resultant adsorbent has imparted Lewis acidity to at least the degree recited herein below. For example, the metal may be introduced in the form of a precursor material, such as a metal salt or other metal precursor that is soluble in the media selected for forming the matrix or for contacting the matrix with the precursor (b) or mixtures thereof. It is believed, though not meant to be a limitation on the present invention, that when components (a) and (b) are contacted to form the adsorbent or when the initially formed adsorbent is further processed and/or activated, as described herein below, a metal oxide moiety of the metal of precursor (b) is formed as part of the matrix.

The Lewis acidity of the present adsorbent should be at least 500 µmol/gm (e.g. 600 µmol/gm, 700 µmol/gm, 800 µmol/gm), preferably from 600 to 3000 and more preferably from 700 to 2500(e.g. 750–2000) µmol/gm of adsorbent.

The term "Lewis acidity" as used herein and in the appended claims refers to the ability of a substance to accept electrons from an electron rich substance or atom of such substance. The presence and quantitative values of Lewis acidity can be determined according to the method described by E, Rakiewicz et al., J. Phys. Chem. B, 102, 2890–2896 (1998) entitled "Characterization of Acid Sites in Zeolite and Other Inorganic Systems Using Solid State $^{31}P$ NMR of the Probe Molecule Trimethylphosphine Oxide". The teaching of this reference is incorporated herein in its entirety by reference. The described method provides an analytical procedure to quantitatively determine the Lewis acidity of an inorganic substance and to discriminate between the population of Lewis and Bronsted acid sites therein.

Matrix material (a) of the adsorbent is a silica gel (e.g. hydrogel, aerogel, or xerogel). Silica gels are known solid materials that have a three dimensional structure formed by a plurality of Si and O atoms to produce a polysilica gel structure. Silica hydrogel, also known as silica aquagel, is a silica gel formed in water that has its pores filled with water. A xerogel is a hydrogel with the water removed. An aerogel is a type of xerogel from which the liquid has been removed in such a way as to minimize any collapse or change in the structure as the water is removed.

The matrix forming silica component [Component (a)] of the Lewis acid adsorbent used in the present invention may be formed by known methods. For example, a silica gel may be prepared by conventional means, such as by mixing an aqueous solution of an alkali metal silicate (e.g., sodium silicate) with a strong acid such as nitric or sulfuric acid (preferred), the mixing being done under suitable conditions of agitation to form a clear silica sol which sets into a hydrogel in less than about one-half hour. The concentration of the $SiO_2$ in the hydrogel which is formed is usually in the range of typically between about 15 and about 40, preferably between about 20 and about 35, and most preferably between about 30 and about 35 weight percent, with the pH of the gel being from about 1 to about 9, preferably 1 to about 4. A wide range of mixing temperatures can be employed, this range being typically from about 20 to about 50° C.

The formed material is then washed. Washing is accomplished simply by immersing the newly formed hydrogel in a continuously moving stream of water which leaches out the undesirable salts, leaving about 99.5 wt. % pure silica ($SiO_2$) behind. The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 $m^2/g$ and form xerogels with PV's of 1.4 to 1.7 cc/gm. Silica gel washed at pHs of 3–5 at 50–65° C. for 15–25 hours will have SAs of 700–850 m²/g and form xerogels with PV's of 0.3–0.6 cc/g.

The present adsorbent can be formed by contacting a silica matrix material with a precursor material of a metal capable of imparting Lewis acidity to the resultant product to the degree required herein. The metal atom precursor material may be contacted with the matrix forming material either during gel formation or subsequent to said formation. For example, the Lewis acid forming metal precursor material (b) may be cogelled with the matrix forming silica component (a) or, alternately, the already formed silica matrix material can be treated with a Lewis acid metal precursor in a manner to impart Lewis acidity to the matrix.

The Lewis acid forming metals of the Lewis acid imparting precursor components (e.g. metal salts, metal oxide and the like having solubility in the media used to form the present adsorbent and mixtures thereof) may be incorporated as part of the matrix by various techniques, namely (1) by being intimately incorporated into the gel structure upon formation, e.g., by cogelling a silicate with one or more other gel forming Lewis acid metal precursor material; (2) by admixing the Lewis acid metal precursor material with the initially formed gel particles prior to milling or after milling in slurry form just prior to spray drying to cause agglomeration of the components, as described herein below; (3) by addition of the Lewis acid metal precursor material to an already formed silica gel by means of impregnation or the like; or (4) by contacting the Lewis acid metal precursor material with formed silica hydrogel particles during after-treatment procedure, such as during aging at elevated temperature.

Thus, materials representing the first category are mixed gels such as, for example, silica-alumina, silica-zirconia, silica-titania, silica-titania-alumina, silica-alumina-zirconia, silica-iron and the like cogels. Such cogels show a substantially homogeneous distribution of the Lewis acid imparting metal throughout the bulk and on the surface of the resultant adsorbent. The weight ratio of silica to metal may range from about 100:1 to about 1:3. The preferred weight ratio will depend on the identity of the Lewis acid imparting metal and the degree of Lewis acidity desired.

In the second category, metal containing precursor (b) may be admixed, usually in slight proportions, with a preformed silica matrix material, such as silica hydrogel particles, prior to milling and/or just prior to agglomeration. This method is most suitable when it is contemplated to form the resultant adsorbent from silica gel material which is to undergo physical mixing, milling and/or agglomeration to prepare the resultant particulate adsorbent for use in the present improved process.

In the third category, the metal precursor material or other material used to impart Lewis acidity can be contacted with the already formed silica matrix material by known techniques, such as that of incipient wetness impregnation wherein the silica gel is contacted with a solution (aqueous or low molecular weight organic solvent) of a soluble (with respect to solvent of the solution) metal precursor followed by removal of the solvent. When employing this method, the Lewis acid sites imparting metal ions are located almost entirely on the surface area of the adsorbent.

In the fourth category, the silica matrix material may be a gel, such as a silica hydrogel, which, following an impregnation step, is subjected to an aging procedure. Aging of gels can be conducted at elevated temperatures such as, for example at a temperature of from about 50 to 200° C. (e.g. 65–90° C.) and elevated pH of from about 7.5 to 10 (e.g. pH of 8–9) for 4–12 hours. In this case, the resulting product shows a surface enrichment in Lewis acid sites with a decreasing concentration of such sites into the bulk of the matrix.

In each of the above resultant adsorbents, the Lewis acid imparting metal can be present (as metal oxide) in from 1 to 80 weight percent of the resultant adsorbent with, preferably, from 1 to 30 and from 1 to 20 weight percent being most preferred.

The preferred adsorbent is a highly porous silica gel having pores of large diameter. The average pore diameter should preferably be from about 40 to about 400, more preferably from about 45 to about 100 and most preferably from 45 to 75 Angstroms.

The preferred adsorbents are formed by producing a silica gel with an aluminate to provide a silica gel having Lewis acidity imparted by the aluminum atoms to the degree described herein above; or by cogelling an alkali metal silicate in the presence of a zirconium salt; or by treating a silica sol with carbon dioxide, aging at elevated temperature and then adding aluminate to the sol to cause gel formation to provide the desired Lewis acidity. Combinations of the above are also preferred materials, such as, for example, silica gel having zirconium atoms and aluminum atoms present.

Other constituents which may be present, include those constituents not adversely affected by water, spray drying or calcination, as appropriate with respect to the method of forming the adsorbent particulate, such as finely divided oxides or chemical compounds. Similarly, it is possible to add powders or particles of other constituents to the gel particles to impart additional properties to the resultant adsorbent. Accordingly, there may be added materials that possess additional absorbent properties, such as synthetic zeolites. In addition, one may add materials that act as a binder to aid in the attrition resistance of the resultant particulate. Such binders may be selected from clays, such as, for example, attapulgite, bentonite, sepiolite and the like and mixtures thereof usually in colloidal or powder form. The skilled artisan will appreciate that the amounts of such additional components must be restricted in order to avoid compromising the desired adsorption properties described herein.

Also, it is feasible to add constituents to the silica which may be eliminated after agglomeration in order to control porosity within a desired range; such agents as cellulose, graphite, wood charcoal, and the like being particularly useful for this purpose. When such materials are to be employed, they may be added in conventional manners prior to gel formation or prior to agglomeration. However, when milling and agglomeration is used in the formation of the resultant particulate adsorbent, it is preferable that they be present in the gel during or prior to milling as described since they will be less likely to disturb the desired agglomerate morphology after spray drying when they are also subjected to milling.

In view of the above, the term "gel" (e.g. "silica gel"), as used herein and in the appended claims, is intended to include the optional inclusion of the aforementioned non-gel constituents permitted to be present in the inorganic oxide adsorbent.

The present adsorbent has a surface area (BET technique described by S. Brunauer, P. Emmett and E. Teller in J.A.C.S. 60, 209–319 (1939)) of greater than about 200 m²/g, preferably from 300 to 1000, more preferably from 400 to 600 and most preferably from 400 to 550 m²/g. Further the present adsorbent has nitrogen pore volume (BET) of at least 0.5, preferably from 0.5 to 1.8, more preferably from 0.6 to 1.5 and most preferably from 0.6 to 01.2 cc/g. Still further, the average pore diameter of the adsorbent should be preferably from about 40 to 400, such as from 45 to 200, more preferably from 45 to 100 and most preferably from 45 to 75 Angstroms.

The metal precursor material or other material used to impart Lewis acidity may be added to the matrix forming inorganic raw materials as part of the hydrogel or xerogel or aerogel formation or can be added to the formed hydrogel or xerogel or aerogel prior to milling, spray drying or extrusion to provide the resultant particulate adsorbent of the present invention. It is preferred to incorporate the metal precursor material or other material for imparting Lewis acidity into an inorganic oxide sol (i.e. silica sol) as part of hydrogel or xerogel or aerogel formation.

The subject adsorbent may be formed into particulate material in accordance with methods well known to the art, such as by spray drying, grinding and screening of larger particles of gelled material, pelletizing, extrusion, shaping into beads in a rotating coating drum, and the like as well as by a nodulizing technique whereby composite particles having a diameter of not greater than about 0.05 mm are agglomerated to particles with a diameter of at least about 1 mm by means of granulation. A liquid may also be employed.

The particle size of the adsorbent will depend on the contemplated mode of contact of the adsorbent and the petroleum feedstream for a particular process system. For example, when the adsorbent is contemplated for use in a packed bed column or the like, the particle size of the adsorbent should be from about 0.2 to about 20, such as from about 0.5 to about 5 mm, with from about 0.6 to 1.5 mm being preferred. Particles of smaller or larger particle size may be used and will depend on the design of the particular column used. The exact particle size can be determined by known methods by those skilled in the art. Similarly, when contact of the adsorbent and petroleum feedstream is to be done in a fluidized bed, the particle size of the adsorbent should be from about 10 to about 100 micrometer.

A preferred adsorbent is formed by cogelling an alkali metal silicate with an inorganic acid (e.g. sulfuric acid) (the sol is formed after the two raw materials have been contacted) that contains dissolved zirconium, titanium or aluminum salt or mixtures thereof, such as a zirconium, titanium or aluminum sulfate salt in sulfuric acid. The resultant cogelled material will contain the elected Lewis acid imparting metal atoms (e.g. zirconium atoms) as a substitute for some of the silicon atoms in the formed gel matrix to thus impart Lewis acidity to the formed material. Another preferred adsorbent is formed by gellation of an alkali metal silicate using carbon dioxide in the presence of aluminum sulfate. The resultant gel is then ground or milled to reduce the average particle size of the material to about 0.2 to about 20 (e.g. 0.2 to about 10), preferably from about 0.5 to about 5 mm, with from 0.6 to about 1.5 mm being still more preferred and from 0.7 to about 1.2 mm being most preferred.

Alternatively, the present adsorbent may be made by drying, preferably spray drying, a slurry of the Lewis acid metal precursor material and a matrix producing inorganic oxide (e.g. silica gel) or of an already formed Lewis acid metal containing silica gel followed by agglomeration. More specifically, in this embodiment, the adsorbent is formed into a slurry, preferably an aqueous slurry, comprising typically at least 50, preferably at least 75 (e.g., at least 80), and most preferably at least 85 (e.g., at least 90) weight percent water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as subject adsorbent.

To render a gel suitable for agglomerate (particulate) formation, e.g. by spray drying, various milling procedures are typically employed (although not required). The goal of a milling procedure is to ultimately provide gel material with an average particle size of typically from about 0.2 to about 10 (e.g. 2 to about 10) preferably from about 4 to about 9, and most preferably from 4 to 8 microns. In addition, to aid in the formation of agglomerate particulate material, the gel may contain a binder material, such as a silica sol having known binding properties or additional material that has a particle diameter in the colloidal range of typically less than about 1, preferably less than about 0.5, and typically from about 0.4 to about 1 micron. All particle size and particle size distribution measurements described herein are determined by laser light diffraction and is known to all familiar in the art of small particle analysis.

Once the target average particle size is imparted to the silica gel, a slurry, preferably an aqueous slurry, is prepared for agglomeration, preferably by spray drying. Agglomerate particles formed in the above manner are of a size normally suitable for slurry or fluidized bed application for contacting the subject adsorbent with the LGO petroleum feedstock.

Another suitable method for making the present adsorbent is by the agglomeration or extrusion of silica gel or of an already formed Lewis acid metal containing silica gel. More specifically, in this process the gel material with an average particle size of 3 to about 100 preferably from about 4 to about 30, and most preferably from 4 to 10 microns is agglomerated or extruded in the presence of a binder. Such binders may be selected from clays or colloidal clays such as, for example, attapulgite, bentonite, sepiolite and the like and mixtures thereof, colloidal or submicron silica, silica hydrogels, aluminas and the like and mixtures thereof. Extrusion and agglomeration may be carried out by known methods which include, but are not limited to, single- and twin-screw extruders, pelletizer, different types of shear impact mixers, such as screw mixer, or pelletizing mixer. For example, the gel binder mixture is processed to a paste using a solvent (e.g. water) and then extruded. In the case of agglomeration, the gel-binder mixture is beaded in the presence of a liquid, such as water, diluted citric acid or silica sol.

The resultant particulate material is normally dried to remove the processing liquid (water or organic solvent). The drying is normally conducted at elevated temperatures of from about 50 to 250° C., although lower or higher temperatures may be used. Drying is normally conducted at atmospheric pressure although reduced pressure may be employed. The dried particulate material is then activated by calcination of the material. Thus, the material is subjected to elevated temperature such as, for example, from about 200 to 600, preferably from 400 to 600° C., under an oxygen laden atmosphere, such as air.

Accordingly, whatever overall process is utilized, the particulate formation is controlled to preferably impart the following properties to the adsorbent:

(1) A surface area (BET) of typically at least about 200, preferably at least about 300, and most preferably from at least about 450 m²/g, which surface area can range typically from about 300 to about 1000, preferably from about 400 to about 600, and most preferably from about 400 to about 550 m²/g.

(2) An average pore diameter (BET) of from about 40 to about 400, preferably from about 45 to 200, more preferably from about 45 to 100, and most preferably from about 45 to about 75 Angstroms (In instances where the particles are in the form of beads or extrudate, the particles may also contain pores of greater than 1000 Angstroms which can be detected and measured by utilizing mercury diffusion method of measurement);

(3) A total pore volume of at least 0.5 with from 0.5 to about 1.8, preferably from about 0.6 to about 1.5, and most preferably from about 0.6 to about 1.2 cc/g; and (4) A bulk density of the adsorbent particles of typically at least about 0.2, preferably at least about 0.3, and most preferably at least about 0.4 g/ml, which bulk density can range typically from about 0.2 to about 1, preferably from about 0.3 to about 0.8, and most preferably from about 0.4 to about 0.7 g/ml.

(5) An attrition resistance that provides sufficient strength to allow the adsorbent to undergo multiple adsorption/desorption cycles (e.g. 50 to 1000).

The particle size and particle size distribution sought to be imparted to the adsorbent particles is dictated and controlled by the contemplated mode of contact by which the adsorbent and the petroleum feedstock will be employed as well as by the specific design parameters of the contacting operation (e.g. pressure drop within a column). For example, when a packed column is to be employed, the particulate should have a particle size distribution wherein the majority of particles (>95%) are less than 2, preferably less than 1.6 and more preferably less than 1.4 mm while only a minority of particulate (<10%, preferably <7%, most preferably <5%) are less than 0.6 mm in average diameter.

The petroleum feedstock may be contacted with the adsorbent under temperature and pressure conditions that maintain the petroleum feedstream material in a liquid state during the adsorption operation. For example, the temperature conditions may range from about 0 to 100° C., preferably from about 20 to 60° C. and with pressures of from about 1 to 15 bar, preferably from about 1 to 5 bar. The pressure conditions depend on the specific design of the column, the adsorbent particle size and the feed viscosity, so that even higher pressures than those mentioned here may to be applied under conditions well known to the artisan. Preferably, the feedstream may be contacted with the subject adsorbent under atmospheric pressure conditions and at a temperature dictated by the petroleum feedstream obtained from prior processing. The particular temperature and pressure for optimization of the adsorption can be readily determined by simple experimentation.

The present adsorbent has been found to effectively remove nitrogen compounds from $C_{12}$ and higher petroleum feedstock. Such feed streams are known to contain a varied and complex mixture of nitrogen compounds normally believed difficult to remove in an efficient manner.

The present adsorbent can be contacted with the feedstream by using any conventional means of contacting a solid and liquid material, such as using a packed column, a fluidized bed column or an ebullated bed column. It is preferred to utilize the present absorbent by using it as the packing of a packed column. The size and residence time of the column design can be determined by the nature of the feedstream contemplated for treatment. Normally, when a continuous system is desired, a plurality of columns are used in parallel so that at least one column is in the adsorption mode while the remaining columns are in a desorption or regeneration mode for continuous treatment of a petroleum feedstream.

When the subject adsorbent is spent (that is, has a reduction in adsorption rate below a certain predetermined design level), the adsorbent is removed from service for adsorption of the nitrogen compounds, and regenerated for return to service as an adsorbent. In a continuous system, when one column containing spent adsorbent is removed from service, a second column having regenerated adsorbent is placed into service. It has been found that the present adsorbent can be treated to adsorption, desorption and regeneration in a cyclic manner for extended periods (multiple cycles) prior to needing to be removed from service.

The continuous process can be described as first feeding a petroleum feed obtained from a distillation or FCC unit or its equivalent into one of at least two adsorption columns packed with the presently described adsorbent. The adsorption columns are located prior (normally just prior) to the HDS units of a flow diagram of the total petroleum process being utilized. The stream is fed into the column for a predetermined time to utilize substantially all of the adsorption capacity of the subject adsorbent. Such time can be determined for a particular column unit by conventional experimentation. Once substantially all of the adsorption capacity is utilized, the feedstock is directed to another adsorption column while taking the first unit out of the adsorption mode.

The first adsorption column is then subjected to desorption to remove collected nitrogen containment compounds from the adsorbent therein. It is believed, though not meant to be a limitation on the claimed invention, that, because the nitrogen contaminant compounds are merely adsorbed and/or absorbed either physically or through ionic or dative bonding or the like and not, in general, bound to the adsorbent by covalent bonds, the nitrogen contaminants can be readily removed by use of a polar organic solvent or other compound that is a solvent for a majority or, preferably, substantially all of the nitrogenous compounds. The solvent needs to be inert, that is inert with respect to the adsorbent, residual petroleum feedstock and other compounds in the adsorbent and will not cause formation of a solid precipitate with the nitrogenous compounds. In general, the adsorbent is treated with an inert, low boiling liquid that is preferably selected from a polar organic liquid, although non-polar liquids may also be used. The desorption liquid is usually selected from $C_1$–$C_6$ alcohols such as straight and branched chain alkanols as, for example, methanol, ethanol, propanol (all isomers), butanol (all isomers), pentanol (all isomers), hexanol (all isomers), mixtures thereof and the like; $C_1$–$C_6$ ethers such as dialkyl ethers and alkyl cycloalkyl ethers as, for example, dimethyl ether, diethyl ether, dipropyl ether, methyl t-butyl ether, methyl cyclopropyl ether, methyl cyclobutyl ether, ethyl cyclobutyl ether, mixtures thereof and the like; $C_1$–$C_6$ aldehydes such as alkyl and cycloalkyl containing aldehydes, as acetaldehyde, propianaldehyde, butylaldeahyde, malonaldehyde, mixtures thereof and the like; $C_1$–$C_6$ ketones such as dialkyl ketones as for example, acetone, methyl ethyl ketone, methyl propyl ketone, methyl butyl ketone, ethyl propyl ketone, methyl cyclopropyl ketone, methyl cyclobutyl ketone, mixtures thereof and the like. Higher molecular weight desorption liquids may be used although their increased boiling point requires more energy for stripping the liquid from the nitrogen material and, therefore, are less preferred.

The desorption solvent is contacted with the nitrogen compound laden adsorbent usually be merely passing the solvent through the packed column for a predetermined time to remove substantially all of the nitrogenous compounds therefrom. Such time can be readily determined by simple experimentation and may be done in coordination with the determination of suitable adsorption time for the adsorbent, as described above. Resultant solvent that contains the nitrogenous contaminants is then removed. Optionally, the solvent is separated from the nitrogen contaminants and recycled for additional desorption.

Determination of both the adsorption and desorption times to effectively adsorb and desorb the nitrogenous compounds will depend on the column design, petroleum feedstock being treated, temperature of the feedstock as well as other known factors.

The desorbed column may be directly returned to adsorption function or may, optionally, be further treated to remove any remaining solvent, petroleum residue capable of fouling the column, or the like before being returned to service as an adsorption column.

The high boiling petroleum product stream obtained from the adsorption process described above is subsequently treated to a hydrodesulfurization process (HDS). In general, such processes entail contacting the obtained petroleum material with a conventional HDS catalyst at elevated temperatures (e.g. 250 to 450° C.) and pressure (e.g. 10 to 150 bars) with a hydrogen to oil ratio of 36 to 620 $m^3/m^3$. HDS catalysts in general have acidic sites, which are poisoned by the presence of nitrogen containing compounds. Thus, the present process, where these nitrogen compounds are removed prior to the HDS processing, provides an efficient manner to remove the nitrogen and sulfur contaminants from the high boiling cuts obtained from petroleum feedstock.

All references herein to elements or metals belonging to a certain Group refer to the Periodic Table of the Elements in Hawley's Condensed Chemical Dictionary, $12^{th}$ Edition. Also, any references to the Group or Groups shall be to the Group or Groups as reflected in this Periodic Table of Elements using the IUPAC notation system for numbering groups.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1
Formation of Silica-zirconia Adsorbent.

A cogel of silica-zirconia was formed using a mixing nozzle having the capability for concurrent introduction of two liquid streams followed by passage of the introduced liquids through a tortuous path capable of providing rapid mixing of the streams. An aqueous solution of sodium silicate (analysis: 24.2% $SiO_2$, 7.5% $Na_2O$) was introduced into the mixing nozzle at the rate of 29.5 l/hr while simultaneously introducing, at a rate of 10.5 l/hr, a sulfuric acid solution having zirconium orthosulfate dissolved therein (analysis: 30.7% $H_2SO_4$; 3.2% $ZrO_2$). Upon exiting from the mixing apparatus, a silica hydrogel having zirconium metal as the Lewis acid promoter was formed within 11 minutes. 2500 parts of the resultant hydrogel was washed by passing 2100 parts of water maintained at 60° C. through the hydrogel product over a one hour period. This washing step was repeated three additional times. After the final wash, the resultant hydrogel was sequentially treated (a) with a first solution of 2100 parts water containing 103 parts of an aqueous 12.5% ammonia solution for 4 hours at 90° C.;

(b) repeating treatment (a) above;

(c) repeating treatment (a) above except only 5 parts of the aqueous ammonia solution was introduced with the water and the duration was 2 hours;

(d) contacting the hydrogel with 2100 parts water containing 24 parts of an aqueous 45% sulfuric acid solution for 2 hours at 60° C.; and (e) washing 4 times, each with 2100 parts water for 1 hour at 60° C.

The washed hydrogel was dried for 15 hours at 200° C. followed by heating at 400° C. for 2 hours. The resultant activated silica-zirconia aerogel was cooled to ambient conditions under a dry atmosphere.

The resultant gel contained 3.2 weight percent zirconium (as $ZrO_2$) (SAMPLE I). The Lewis and Bronsted acidities were measured by the procedure of E. Bakiewicz et al, described in J. Phys. Chem. B 102 2890–2896 (1998). The physical properties of BET surface area, pore volume and pore diameter were measured using conventional methodology for these properties. Table I below shows the Lewis and Bronsted acidity as well as physical properties of the resultant adsorbent.

TABLE I

Physical Properties of $SiO_2$ $ZrO_2$ Adsorbent

| | Lewis Acidity μmol/g | Bronsted Acidity μmol/g | Surface Area $m^2/g$ | Pore Vol. cc/g | Avg. Pore Diameter Å |
|---|---|---|---|---|---|
| $SiO_2$ with 3.2% Zr (as $ZrO_2$) | 1940 | 0 | 467 | 0.78 | 67 |

EXAMPLE 2
Formation of Alumina Modified Silica Adsorbents

Four samples of spray dried silica gel having aluminum atoms in the matrix to impart Lewis acidity were formed as follows.

IIA. An aqueous silica sol was formed by initially dissolving sodium silicate (analysis: 24.2% $SiO_2$, 7.5% $Na_2O$) in water heated to 85° C. at a silicate/$H_2O$ ratio of 0.15 to produce an aqueous silica sol. The silica sol was mixed with carbon dioxide at a rate such that the gel time of the silica sol was between 10 and 30 seconds. The mixing was performed using a pipe reactor to enable intimate mixing of the materials. The gel was further mixed in the reactant water for approximately 140 minutes to allow gel structure development to be completed. The gel was then pumped through a static mixer while adding an aluminum sulfate solution at the silica to alumina ratio 28/5. Due to the change in pH, carbon dioxide gas expelled from the gel mixture. The resultant alumina-silica hydrogel was dewatered at 200° C. for 15 hours and spray dried to form spherical particles (1100 psi). The resultant powdered product was then slurried in water and washed with ammonium sulfate solution to exchange soda in the same manner as described in Example 1 above. The resultant material was flash dried at 182° C. The dried spherical particles (about 60 µm in diameter) were then milled to about 8 µm particle size using a jet mill. The powder was then formed into beads of about 1 mm in diameter according to the procedure described below.

II B. The process of IIA described above was repeated except that the sol was initially formed at about 35° C. instead of 85° C.; using a silicate/H20 ratio of 0.24 instead of 0.15; and aging the gel for 60 minutes instead of 140 minutes.

II C. A sample was prepared in the same manner as described for Sample II B, except that additional sodium aluminate (19% $Al_2O_3$) was added after the aging step to produce a product having an alumina content of 25 weight percent.

II D This sample was formed in the same manner as described for Sample II B except that the resultant material was used in powder form with a particle size of between 20 and 70 micrometers. The material was not formed into beads as described below.

Formation of Beads from Alumina Modified Silica Powders:

800 parts of each of the above Samples II A, II B and II C (not II D) was separately mixed with 200 parts of binder (Sample II A with boehmite; Samples II B and II C with attapulgite clay) in an Eirich mixer for half an hour. Each of the resulting powder mixtures was agglomerated by adding an appropriate amount of water to observe bead formation. The water content differed depending on the silica-alumina powder and on the binder system used. The particle size of the beads was between 0.6 and 1.4 mm.

The resultant samples were dried for 15 hours at 120° C. and then activated at 550° C. for about 2 hours. The Lewis and Bronsted acidities were measured by the procedure of E. Bakiewicz et al, described in J. Phys. Chem. B 102 2890–2896 (1998). The physical properties of BET surface area, pore volume and pore diameter were measured using conventional methodology for these properties. The resultant particulate adsorbents were analyzed to have the properties shown in Table II below.

TABLE II

| Sample | Lewis Acidity µmol/g | Bronsted Acidity µmol/g | Al content (as $Al_2O_3$) wt. % | Surface Area $m^2/g$ | Pore Vol. cc/g | Av. Pore Dia. Å |
|---|---|---|---|---|---|---|
| II A | 1050 | 270 | 13.1 | 338 | 0.69 | 81 |
| II B | 1000 | 30 | 13.3 | 267 | 0.93 | 140 |
| II C | 1240 | 100 | 25.0 | 364 | 0.64 | 70 |
| II D | 1100 | 260 | 13.1 | 329 | 1.1 | 134 |

EXAMPLE 3

Formation of Silica Gel (Comparative)

Two silica xerogels (Samples III-Si/1 and III-Si/2) were formed in the same manner as described in Example I above except that the initial sulfuric acid solution did not contain zirconium or other Lewis acid metal precursor agent. The washing and aging conditions were altered for each sample in order to adjust the desired pore structure.

Sample III-Si/1:

2500 parts of the resultant hydrogel was washed by passing 2100 parts of water maintained at 60° C. through the hydrogel product over a one hour period. This washing step was repeated three additional times. After the final wash, the resultant hydrogel was sequentially treated (a) with a first solution of 2100 parts water containing 103 parts of an aqueous 12.5% ammonia solution for 4 hours at 60° C.;

(b) contacting the hydrogel with 2100 parts water containing 24 parts of an aqueous 45% sulfuric acid solution for 2 hours at 60° C.; and (c) washing 3 times, each with 2100 parts water for 1 hour at 60° C.

Sample III-Si/2:

2500 parts of the resultant hydrogel was washed by passing 2100 parts of water maintained at 60° C. through the hydrogel product over a one hour period. This washing step was repeated three additional times. After the final wash, the resultant hydrogel was sequentially treated (a) with a first solution of 2100 parts water containing 103 parts of an aqueous 12.5% ammonia solution for 4 hours at 70° C.;

(b) contacting the hydrogel with 2100 parts water containing 24 parts of an aqueous 45% sulfuric acid solution for 2 hours at 60° C.;

(c) washing 2 times, each with 2100 parts water for 1 hour at 60° C.; and (d) washing with a solution of 2100 parts water containing 103 parts of an aqueous 12.5% ammonia solution for 3 hours at 90° C.

Alumina Adsorbent (Comparative)

A commercially available alumina adsorbent product, Hi Q 30 sold by Alcoa World Chemicals, was labeled Sample III-Al/1 and compared to the subject adsorbent of the present invention. The sample was in powder form with particle sizes between 20 and 70 micrometer.

Each of the comparative samples described above was dried at 200° C. for 15 hours and then heated at 400° C. for 2 hours. The samples were then allowed to cool to ambient temperature under a dry atmosphere. The Lewis and Bronsted acidities for each sample was measured by the procedure of E. Bakiewicz et al, described in J. Phys. Chem. B 102 2890–2896 (1998). The physical properties of BET surface area, pore volume and pore diameter were measured using conventional methodology for these properties.

Table III below shows the Lewis and Bronsted acidity as well as physical properties of the comparative adsorbents.

TABLE III

Physical Properties of $SiO_2$ and Alumina Gels

| Sample | Lewis Acidity µmol/g | Bronsted Acidity µmol/g | Surface Area $m^2/g$ | Pore Vol. cc/g | Avg. Pore Diameter Å |
|---|---|---|---|---|---|
| III-Si/1 | 0 | 0 | 498 | 0.88 | 71 |
| III-Si/2 | 0 | 0 | 275 | 1.16 | 168 |
| III-Al/1 | 80 | 60 | 116 | 0.50 | 172 |

EXAMPLE IV

Each of the silica-zirconia adsorbent formed according to Example I, the step silica-alumina adsorbents formed according to Example II; and the comparative adsorbents of Example III was heated in a muffle oven at for 15 hours at 200° C. followed by heating at 750° F. (400° C.) for 2 hours. The samples were then allowed to cool to ambient temperature under a dry atmosphere.

Each of the samples was tested according to the following procedure:

Various amounts of each adsorbent were charged into separate test columns followed by certain amounts of an LGO petroleum feedstream material (B.P. range of 164 to 458° C.; total nitrogen of about 220 ppm, total sulfur 1.56 wt-%). For details of the feed to adsorbent ratios see Tables below. The total nitrogen content of the LGO petroleum feedstream material was analyzed by photometric spectrometry using a commercial nitrogen analyzer (ANTEK Analyzer).

Each of the test columns was maintained under agitation for 4 hours at 40° C. to allow adsorption equilibrium to occur. The remaining petroleum material was removed from each column by centrifuging and analyzed for total nitrogen content in the same manner as done with the LGO petroleum feedstream material. The nitrogen adsorption capacity attained by the adsorbent of each test column was calculated according to the formula:

$$C = (c_o - c) m(\text{feed}) / m(\text{adsorbent})$$

where: C is the equilibrium nitrogen adsorption capacity in mg/g; $c_o$ is nitrogen concentration of feed, c is nitrogen concentration of feed product after equilibration in contact with adsorbent; m (feed) is mass of LGO petroleum tested; and m (adsorbent) is mass of adsorbent in column.

For each test the calculated adsorption capacity was normalized with respect to the surface area (BET) of the adsorbent. The results are reported in Tables IV through XI below as adsorption capacity ($mg/m^2$).

TABLE IV

Sample I

| m(ads) (g) | m(feed) (g) | c (ppm) | c/co | Capacity (mg/m2) |
|---|---|---|---|---|
| 0.67 | 20 | 103 | 0.46 | 0.0078 |
| 1.33 | 20 | 67 | 0.30 | 0.0051 |
| 2.66 | 20 | 38 | 0.17 | 0.0030 |
| 4.00 | 10 | 10 | 0.04 | 0.0012 |

TABLE V

Sample IIA

| m(ads) (g) | m(feed) (g) | c (ppm) | c/co | Capacity (mg/m2) |
|---|---|---|---|---|
| 0.17 | 10 | 151 | 0.66 | 0.0138 |
| 0.33 | 10 | 108 | 0.47 | 0.0110 |
| 0.37 | 10 | 70 | 0.30 | 0.0071 |
| 1.34 | 10 | 42 | 0.18 | 0.0042 |
| 4.00 | 10 | 10 | 0.04 | 0.0016 |

TABLE VI

Sample IIB

| m(ads) (g) | m(feed) (g) | c (ppm) | c/co | Capacity (mg/m2) |
|---|---|---|---|---|
| 0.67 | 20 | 125 | 0.55 | 0.0113 |
| 1.33 | 20 | 86 | 0.38 | 0.0079 |
| 2.66 | 20 | 52 | 0.23 | 0.0049 |
| 4.00 | 10 | 16 | 0.07 | 0.0020 |

TABLE VII

Sample IIC

| m(ads) (g) | m(feed) (g) | c (ppm) | c/co | Capacity (mg/m2) |
|---|---|---|---|---|
| 0.35 | 20 | 137 | 0.59 | 0.0149 |
| 0.37 | 20 | 108 | 0.46 | 0.0102 |
| 1.33 | 20 | 71 | 0.31 | 0.0066 |
| 2.66 | 20 | 45 | 0.19 | 0.0039 |
| 8.00 | 20 | 14 | 0.061 | 0.0015 |

TABLE VIII

Sample IID

| m(ads) (g) | m(feed) (g) | c (ppm) | c/co | Capacity (mg/m2) |
|---|---|---|---|---|
| 0.18 | 10 | 140 | 0.58 | 0.0169 |
| 0.35 | 10 | 101 | 0.42 | 0.0121 |
| 0.67 | 10 | 70 | 0.29 | 0.0077 |
| 1.33 | 10 | 43 | 0.18 | 0.0045 |
| 4.00 | 10 | 13 | 0.05 | 0.0017 |

TABLE IX

Sample III-Si/1

| m(ads) (g) | m(feed) (g) | c (ppm) | c/co | Capacity (mg/m2) |
|---|---|---|---|---|
| 0.66 | 20 | 129 | 0.62 | 0.0048 |
| 1.33 | 20 | 86 | 0.42 | 0.0037 |
| 2.66 | 20 | 55 | 0.26 | 0.0023 |
| 4.00 | 10 | 16 | 0.08 | 0.0010 |

TABLE X

Sample III-Si/2

| m(ads) (g) | m(feed) (g) | c (ppm) | c/co | Capacity (mg/m2) |
|---|---|---|---|---|
| 0.66 | 20 | 128 | 0.62 | 0.0087 |
| 1.33 | 20 | 100 | 0.48 | 0.0059 |
| 2.66 | 20 | 70 | 0.34 | 0.0038 |
| 4.00 | 10 | 27 | 0.13 | 0.0016 |

TABLE XI

Sample III-Al/1

| m(ads) (g) | m(feed) (g) | c (ppm) | c/co | Capacity (mg/m2) |
|---|---|---|---|---|
| 0.18 | 10 | 205 | 0.85 | 0.0172 |
| 0.35 | 10 | 189 | 0.78 | 0.0128 |
| 0.67 | 10 | 161 | 0.67 | 0.0102 |
| 1.33 | 10 | 119 | 0.50 | 0.0079 |
| 4.00 | 10 | 43 | 0.18 | 0.0043 |

The principals, preferred embodiments and modes of operation of the invention have been described in the foregoing specification. The invention which is intended to be protected herein, however, is not to be contrued as limited to the particular forms disclosed, since these are to be regarded as illustrative rather than restrictive. Variations and changes may be made by those skilled in the art, without departing from the spirit of the invention.

We claim:

1. A method of manufacturing $C_{12}$ and higher hydrocarbon fuel having reduced
nitrogen and sulfur content comprising (a) contacting, prior to hydrodesulfurization, a $C_{12}$ or greater petroleum feedstream having nitrogen and sulfur containing compounds therein with a porous, particulate adsorbent comprising a silica matrix having Lewis acidity of at least about 500 µmol/g; and (b) subsequently treating the feedstream product derived from (a) to catalytic hydrodesulfurization to produce a hydrocarbon fuel.

2. The method of claim 1 wherein the adsorbent has a surface area of at least 200 $m^2/gm$; a $N_2$ pore volume of at least about 0.5 cc/gm; and an average pore diameter of from 40 to 400 Å and contains metal atoms of Group IB, IIA, IIB IIIA, IIIB, IVA, VA, VIA or VIIIA of the Periodic Table in an effective amount to provide Lewis acidity of at least about 500 µmol/g.

3. The method of claim 1 wherein the petroleum feedstream comprises $C_{12}$–$C_{30}$ hydrocarbons prior formed by fluid catalytic cracking or by distillation of petroleum feed.

4. The method of claim 1 wherein the petroleum feedstream is contacted
with adsorbent in a packed bed zone comprising at least one packed bed adsorption column.

5. The method of claim 2 wherein the petroleum feedstream is contacted
with adsorbent in a packed bed zone comprising at least one packed bed adsorption column.

6. The method of claim 3 wherein the petroleum feedstream is contacted with adsorbent in a packed bed zone comprising at least one packed bed adsorption column.

7. The method of claim 1 wherein said petroleum feedstream is contacted
with adsorbent in an adsorption zone selected from a fluidized bed adsorption zone or an embullating bed adsorption zone.

8. The method of claim 2 wherein said petroleum feedstream is contacted with adsorbent in an adsorption zone selected from a fluidized bed adsorption zone or an embullating bed adsorption zone.

9. The method of claim 3 wherein said petroleum feedstream is contacted with adsorbent in an adsorption zone selected from a fluidized bed adsorption zone or an embullating bed adsorption zone.

10. The method of claim 4 wherein the packed bed adsorption zone comprises at least two adsorption columns.

11. The method of claim 5 wherein the packed bed adsorption zone comprises at least two adsorption columns.

12. The method of claim 6 wherein the packed bed adsorption zone comprises at least two adsorption columns.

13. The method of claim 7 wherein the adsorption zone comprises at least two adsorption columns.

14. The method of claim 8 wherein the adsorption zone comprises at least two adsorption columns.

15. The method of claim 9 wherein the adsorption zone comprises at least two adsorption columns.

16. The method of claim 10 wherein the petroleum feedstock is contacted with said adsorbent in at least one first adsorption column and the spent adsorbent in at least one second adsorption column is subjected to desorption to remove prior adsorbed nitrogen containing compounds therefrom.

17. The method of claim 11 wherein the petroleum feedstock is contacted with said adsorbent in at least one first adsorption column and the spent adsorbent in at least one second adsorption column is subjected to desorption to remove prior adsorbed nitrogen containing compounds therefrom.

18. The method of claim 12 wherein the petroleum feedstock is contacted with said adsorbent in at least one first adsorption column and the spent adsorbent in at least one second adsorption column is subjected to desorption to remove prior adsorbed nitrogen containing compounds therefrom.

19. The method of claim 13 wherein the petroleum feedstock is contacted with said adsorbent in at least one first adsorption column and the spent adsorbent in at least one second adsorption column is subjected to desorption to remove prior adsorbed nitrogen containing compounds therefrom.

20. The method of claim 14 wherein the petroleum feedstock is contacted with said adsorbent in at least one first adsorption column and the spent adsorbent in at least one second adsorption column is subjected to desorption to remove prior adsorbed nitrogen containing compounds therefrom.

21. The method of claim 15 wherein the petroleum feedstock is contacted with said adsorbent in at least one first adsorption column and the spent adsorbent in at least one second adsorption column is subjected to desorption to remove prior adsorbed nitrogen containing compounds therefrom.

22. The method of claim 16 wherein the desorption comprises contacting adsorbent containing nitrogen compound with a liquid compound that is a solvent for the nitrogen compounds selected from $C_1$–$C_6$ alkyl and cycloalkyl alcohols, $C_1$–$C_6$ alkyl and cycloalkyl ethers, $C_1$–$C_6$ alkyl and cycloalkyl aldehydes and $C_1$–$C_6$ dialkyl ketones.

23. The method of claim 19 wherein the desorption comprises contacting adsorbent containing nitrogen compound with a liquid compound that is a solvent for the nitrogen compounds selected from $C_1$–$C_6$ alkyl and cycloalkyl alcohols, $C_1$–$C_6$ alkyl and cycloalkyl ethers, $C_1$–$C_6$ alkyl and cycloalkyl aldehydes and $C_1$–$C_6$ dialkyl ketones.

24. The method of claim 1, 2, 3, 4, 5, 6, 7, 8, 9, 10, 11, 12, 13, 14, 15, 16, 17, 18, 19, 20, 21, 22 or 23 wherein the adsorbent comprises a composite formed by contacting (a) a silica selected from silica matrix-forming material or silica matrix formed material or mixtures thereof with (b) a Lewis acid metal precursor compound in an effective amount to impart at least 500 µmol/g Lewis acidity to the resultant adsorbent.

25. The method of claim 24 wherein component (b) comprises a precursor compound having metal atoms of Group IB, IIA, IIB IIIA, IIIB, IVA, VA, VIA or VIIIA of the Periodic Table and the adsorbent has Lewis acidity of at least 600 µmol/g.

26. The method of claim 24 wherein the Lewis acid imparting metal is selected from Mg, Ca, Sr, Ba, B, Al, Ga Zn, Sc, Y, La, Ti, Zr, Hf, V, Nb, Mo, W, Fe, Co, Ni, and mixtures thereof.

27. The method of claim 24 wherein the Lewis acid imparting metal is selected from Mg, Zn, La, Ti, Zr, Fe and Al and mixtures thereof.

28. The method of claim 24 wherein the Lewis acid imparting metal is selected from Ti, Zr, Fe, Al and mixtures thereof.

29. The method of claim 24 wherein component (a) of the adsorbent is selected from silica hydrogel, silica aerogel or silica xerogel or mixtures thereof.

30. The method of claim 26 wherein component (a) of the adsorbent is selected from silica hydrogel, silica aerogel or silica xerogel or mixtures thereof.

31. The method of claim 27 wherein component (a) of the adsorbent is selected from silica hydrogel, silica aerogel or silica xerogel or mixtures thereof.

32. The method of claim 28 wherein component (a) of the adsorbent is selected from silica hydrogel, silica aerogel or silica xerogel or mixtures thereof.

33. The method of claim 24 wherein the adsorbent has Lewis acidity of from about 750 to 2500 μmol/g.

34. The method of claim 32 wherein the adsorbent has Lewis acidity of from about 750 to 2500 μmol/g.

35. The method of claim 32 wherein the adsorbent is selected from a silica hydrogel, silica aerogel or silica xerogel having aluminum atoms therein in sufficient amount to impart Lewis acidity of from 750 to 2500 μmol/g.

36. The method of claim 32 wherein the adsorbent is selected from a silica hydrogel, silica aerogel or silica xerogel having zirconium atoms therein in sufficient amount to impart Lewis acidity of from 750 to 2500 μmol/g.

37. The method of claim 24 wherein the adsorbent has a surface area of from 400 to 550 m 2/gm; a $N_2$ pore volume of from 0.6 to 0.9 cc/gm; and an average pore diameter of from 45 to 75 Å.

38. The method of claim 32 wherein the adsorbent has a surface area of from 400 to 550 m 2/gm; a $N_2$ pore volume of from 0.6 to 0.9 cc/gm; and an average pore diameter of from 45 to 75 Å.

39. The method of claim 16 wherein the adsorbent is formed from a slurry of silica and Lewis acid metal precursor compound in a weight ratio of silica to metal (as metal oxide) of from 0.25:1 to 99:1.

40. The method of claim 18 wherein the adsorbent comprises particulate material having a particle size distribution such that less than 5 weight percent have a diameter of less than 0.6 mm and at least about 95 weight percent have diameter of less than 2 mm.

41. The method of claim 32 wherein the adsorbent comprises particulate material having a particle size distribution such that less than 5 weight percent have a diameter of less than 0.6 mm and at least about 95 weight percent have diameter of less than 2 mm.

42. A method of manufacturing hydrocarbon fuel comprising forming a feedstream comprising $C_{12}$ and higher hydrocarbon compounds wherein said feedstream further comprises nitrogen and sulfur containing compounds, introducing said feedstream to an adsorption zone comprises at least two packed adsorption columns followed by introducing said feedstream to a catalytic hydrodesulfurization zone, wherein said feedstream is introduced to at least one column of the adsorption zone having adsorbent comprising porous particulate selected from silica hydrogel, silica aerogel or silica xerogel or mixtures thereof having from about 1 to 80 weight percent of atoms (as metal oxide) of at least one Lewis acid imparting metal selected from metal atoms of Group IB, IIA, IIB IIIA, IIIB, IVA, VA, VIA or VIIIA of the Periodic Table and having Lewis acidity of at least about 500 μmol/g; surface area of at least 200 $m^2$/gm; $N_2$ pore volume of at least about 0.5 cc/gm; and average pore diameter of at least 40 Å.

43. The process of claim 42 wherein the Lewis acid imparting metal is selected from Ti, Zr, Fe, Al or mixtures thereof; and the adsorbent has Lewis acidity of from 750 to 2500 μmol/g; and average pore diameter of from 40 to 400 Å.

44. The process of claim 42 wherein the Lewis acid imparting metal is selected from aluminum or zirconium or mixtures thereof; and the adsorbent has Lewis acidity of from 750 to 2500 μmol/g; and average pore diameter of from 40 to 400 Å.

* * * * *